(12) United States Patent
Kyriakoglou

(10) Patent No.: US 7,651,019 B2
(45) Date of Patent: Jan. 26, 2010

(54) PROCESS AND APPARATUS FOR FRICTION WELDING

(75) Inventor: Ioannis Kyriakoglou, Derby (GB)

(73) Assignee: Rolls-Royce plc, London (GB)

( * ) Notice: Subject to any disclaimer, the term of this patent is extended or adjusted under 35 U.S.C. 154(b) by 479 days.

(21) Appl. No.: 11/187,911

(22) Filed: Jul. 25, 2005

(65) Prior Publication Data

US 2006/0037993 A1    Feb. 23, 2006

(30) Foreign Application Priority Data

Aug. 19, 2004  (GB)  ................. 0418524.5

(51) Int. Cl.
*B29C 65/06* (2006.01)
*B23K 20/12* (2006.01)

(52) U.S. Cl. ............ 228/112.1; 228/113; 228/2.1

(58) Field of Classification Search ......... 228/112.1, 228/2.1, 113

See application file for complete search history.

(56) References Cited

U.S. PATENT DOCUMENTS

| 3,888,405 A | 6/1975 | Jones et al. |
| 3,954,215 A | 5/1976 | Takagi et al. |
| 3,998,373 A | 12/1976 | Jones et al. |
| 4,757,932 A * | 7/1988 | Benn et al. .......... 228/2.3 |
| 5,858,142 A * | 1/1999 | Tully et al. .......... 156/73.5 |

FOREIGN PATENT DOCUMENTS

| GB | 1 439 277 A | 6/1976 |
| GB | 2 137 774 A | 10/1994 |

OTHER PUBLICATIONS

European Search Report issued in corresponding European Application No. EP 05 25 4596.

* cited by examiner

*Primary Examiner*—Jessica L. Ward
*Assistant Examiner*—Erin B Saad
(74) *Attorney, Agent, or Firm*—Oliff & Berridge, PLC

(57) ABSTRACT

An inertia friction welding process comprises:
  a) providing first and second work pieces to be welded together;
  b) imparting motion to the first work piece relative to the second work piece thereby imparting kinetic energy to the first work piece relative to the second work piece;
  c) applying a predetermined force to move one or both of the first and second work pieces towards the other to create an upset length in the work pieces; characterized by;
  d) measuring the rate of motion of the first work piece relative to the second work piece;
  e) determining a predicted final upset length from the said measured rate of relative motion and said forth;
  f) comparing the predicted final upset length with a desired final upset length;
  g) adjusting the aforesaid kinetic energy to achieve substantially the desired final upset length.

14 Claims, 2 Drawing Sheets

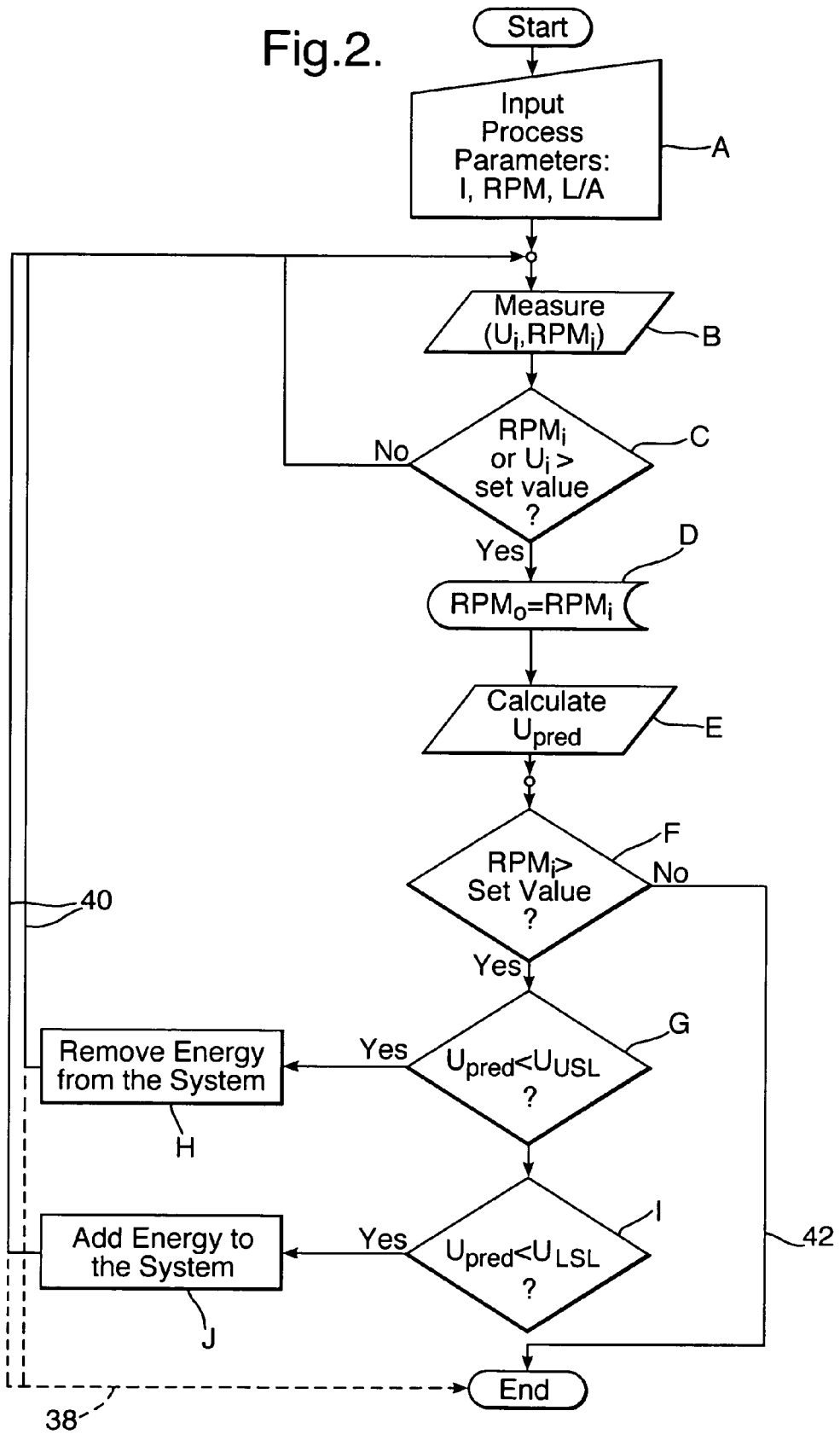

PROCESS AND APPARATUS FOR FRICTION WELDING

This invention relates to friction welding. More particularly, but not exclusively, the invention relates to inertia friction welding.

Inertia Welding is a known process for joining two metallic components and comprises casting one component to and co-axially with a fly wheel, driving the fly wheel up to a given speed of revolution, thereby generating a given value of energy, and forcing the rotating component against the static component after removing the drive from the fly wheel. The energy stored in the fly wheel continues to rotate the component and the resultant friction between the relatively rotating components in turn generate sufficient heat, in the first instance, to soften the interface and secondly to assist the pressure supply to achieve a solid phase weld.

During the friction welding metal is displaced or "upset" which results in a shortening in the overall actual length of the two components. The total amount by which the length of the two components is reduced is referred to as the "upset length".

Achieving an "upset length" with a tight tolerance is important in aerospace applications.

According to one aspect of this invention, there is provided a friction welding process comprising:
 a) providing first and second work pieces to be welded together;
 b) imparting motion to the first work piece relative to the second work piece thereby imparting kinetic energy to the first work piece relative to the second work piece;
 c) applying a predetermined force to move one or both of the first and second work pieces towards the other to create an upset length in the work pieces;
 d) measuring the rate of motion of the first work piece relative to the second work piece;
 e) determining a predicted final upset length from the said measured rate of relative motion and said forth;
 f) comparing the predicted final upset length with a desired final upset length;
 g) adjusting the aforesaid kinetic energy to achieve substantially the desired final upset length.

Preferably, the motion is imparted to the first work piece. The second work piece may be rotatably fixed. The motion is preferably a rotary motion.

According to another aspect of this invention, there is provided a friction welding process comprising;
 a) mounting a first work piece in a rotatable holding member, and mounting a second work piece rotatably in a fixed holding member;
 b) imparting rotary motion to the first work piece to a desired rate of rotary motion thereby imparting kinetic energy to the first work piece;
 c) applying a predetermined axial force to move the work pieces towards one another to create an upset length in the work pieces;
 d) measuring the rate of rotary motion of the first work piece;
 e) determining a predicted final upset length from the set measured rate of rotary motion and said axial force;
 f) comparing the predicted final upset length with a desired final upset length; and
 g) adjusting the aforesaid kinetic energy to achieve substantially the desired upset length.

Steps (d) to (g) may be repeated to achieve the desired final upset length. Steps (d) to (g) may be repeated as often as desired.

Steps (d) to (g) may be repeated until the rate of motion reduces to a predetermined level.

Step (c) may comprise applying a plurality of forces to effect said movement.

The step of adjusting the kinetic energy may comprise increasing the rate of motion when the predicted final upset length is less than the desired final upset length, or may comprise reducing the rate of decrease of the kinetic energy when the predicted final upset length is less than the desired final upset length. The step of adjusting the kinetic energy may comprise decreasing the rate of motion when the predicted final upset length is greater than the desired final upset length, or may comprise enhancing the rate of decrease of the kinetic energy when the predicted final upset length is greater than the desired final upset length.

Step (d) in the process may further include measuring an initial upset length, and/or measuring an initial rate of motion of the first holder. Preferably, when the initial measured upset length is greater than a predetermined value, the process comprises calculating an initial predicted final upset length from the rate of motion at which the aforesaid initial measured upset length is measured.

Step (d) may further include measuring the rate of motion of at least one other stage of the process to determine the predicted final upset length at the, or each, other stage.

According to another aspect of this invention, there is provided a friction welding apparatus comprising a first holder to hold a first work piece, a second holder to hold a second work piece, an energy adjustment arrangement for imparting motion and thereby kinetic energy to the first work piece relative to the second work piece, for a force applying arrangement for applying a force to move one or both of the first and second work pieces towards each other to create an upset length in the work pieces, a measuring arrangement for measuring the rate of motion of the first work piece relative to the second work piece, a processing arrangement for determining a predicted final upset length from the aforesaid measured rate of relative motion and the force, a comparing arrangement for comparing the predicted final upset length with a desired final upset length, wherein the energy adjustment arrangement adjusts the relative kinetic energy to achieve substantially desired upset length.

The drive arrangement may be arranged to impart motion to the first holder. The motion is preferably a rotary motion. The second holder is preferably rotatably fixed.

According to another aspect of this invention there is provided a friction welding apparatus comprising a first holder to hold a first work piece, a rotatably fixed second holder to hold a second work piece, an energy adjustment arrangement for imparting rotary motion and thereby kinetic energy to the first holder, a force applying arrangement for applying a predetermined axial force to move the first and second work pieces towards one another to create an upset length in the work pieces, a measuring arrangement for measuring the rate of rotation of the first work piece, a processing arrangement for determining a predicted final upset length from the aforesaid rate of rotary motion and the axial force, a comparing arrangement for comparing the predicted final upset length with a desired final upset length, wherein the energy adjustment arrangement adjusts the aforesaid kinetic energy to achieve substantially the desired upset length.

The first holder may comprise a fly wheel and may further include a chuck mounted axially on the fly wheel. The second holder may comprise a fixture, which may be a vice.

The force applying arrangement may comprise a hydraulic arrangement. The force applying arrangement may be arranged to apply the aforesaid force to the second holder.

The drive arrangement may be electrically operated, hydraulically operated or powered by internal combustion. The drive arrangement may comprise a motor or an engine.

The adjustment arrangement may comprise the aforesaid drive arrangement to increase the kinetic energy, and may further comprise a braking arrangement to reduce the kinetic energy to brake the first holder. The braking arrangement may comprise the aforesaid drive arrangement configured to reduce the kinetic energy.

The apparatus may further include a sensing arrangement for sensing the upset length. Preferably, the comparing arrangement can compare the rate of rotation of the first holder with a predetermined value and/or may compare an initial upset length with a predetermined value. In the preferred embodiments, when the measured upset length and/or the measured rate of motion is above a predetermined value the comparing means may calculate the predicted final upset length from the measured upset length and/or the measured rate of motion.

Embodiments of the invention will now be described by way of example only, with reference to the accompanying drawings, in which:

FIG. 2 is a flow chart showing a process of inertia welding.

Figure 1:
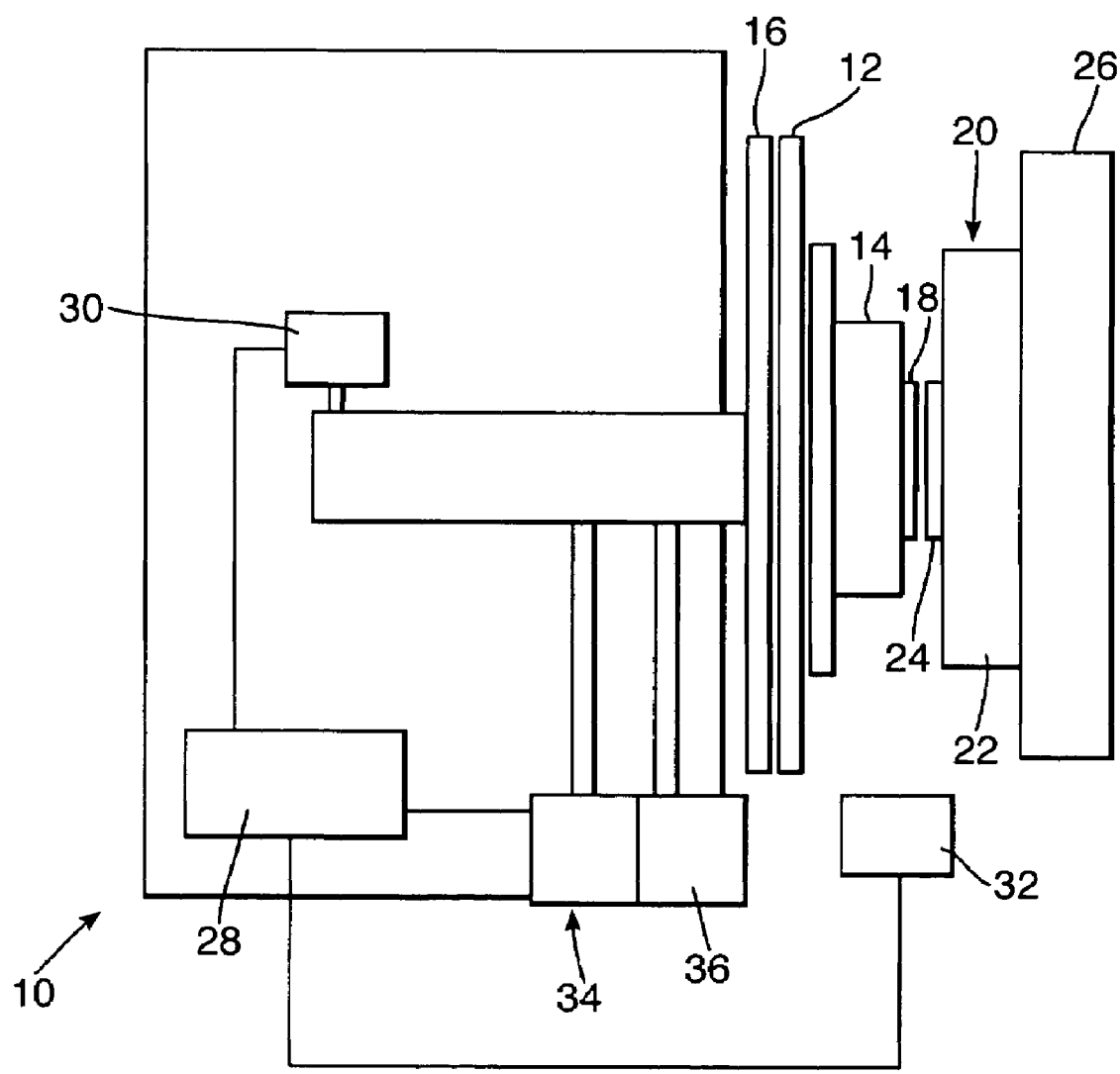
FIG. 1 is a schematic diagram of an inertia welding apparatus.

Referring to FIG. 1 of the drawings, there is shown inertia welding apparatus 10 comprising a first holding member 12 comprising a chuck 14 driven by a fly wheel arrangement 16, which may comprise one, or a plurality of, flywheels. The chuck 14 holds a first component 18. The chuck 14 is fixedly mounted on the fly wheel arrangement 16 and rotates therewith. The apparatus 10 further includes a second holding member 20 comprising a vice 22. The second holding member is rotatably fixed and can hold a second component 24.

A force applying means in the form of an hydraulic ram 26 is provided to apply an axial force and push the vice 22 towards the chuck 14 thereby pushing the second component 24 towards the first component 18. The operation of the hydraulic ram is known by persons skilled in the art and is not described in this specification.

The apparatus 10 also includes a computer processing unit 28 to process information relating to conditions and parameters of the apparatus 10. An RPM Sensor 30 is mounted on the shaft 32 of the fly wheel arrangement 16 to measure the rate of rotation of the fly wheel arrangement 16. An upset sensor 33 is also provided to measure the upset length on appropriate stages throughout the operation of the apparatus 10.

The apparatus 10 also includes an energy adjustment arrangement 34 to adjust the kinetic energy of the fly wheel arrangement 16. The energy adjustment arrangement 34 (can be in the form of) a motor such as an electric, hydraulic or mechanical motor or an internal combustion engine. The energy adjustment arrangement can increase or decrease the speed of the fly wheel arrangement 16. If desired, the energy adjustment arrangement 34 may include a braking arrangement 36 to brake the fly wheel arrangement 16, thereby reducing its kinetic energy.

The energy RPM Sensor 30, the upset sensor 32 and the energy adjustment arrangement 34 are connected to the computer processing unit 28. Thus, information from the RPM Sensor 30, and the upset sensor 32 are transmitted to the computer processing unit 28. The computer processing unit 28 processes this information, together with other information provided to it, as explained below, to control the energy adjustment arrangement 34 and thereby control the speed of rotation of the fly wheel arrangement 16.

In operation, the computer processing unit 30 actuates the energy adjustment arrangement to drive the fly wheel arrangement 16 until it reaches a desired rate of rotary motion, or RPM. When the desired RPM is reached, the hydraulic ram arrangement 26 pushes the second component 24 against the first component 18 and friction between the two components 18, 24 creates heat which softens the two components 18, 24 at their interface allowing them to be welded together. As the components 18, 24 are pushed together, the metal is displaced or "upset" and the length of the two components shortens by the "upset length".

FIG. 2 shows a flow chart depicting the process for operating the apparatus 10, to produce a desired final upset length U. The final upset length U is set within tolerance levels of an upper specified limit $U_{USL}$ and a lower specified limit $U_{LSL}$. The process can be embodied in the embodiments as described below.

Initially, at Stage A, the user inputs suitable process parameters, into the computer processing unit 28, such as, the moment of inertia of the first holding member 12, the RPM of the flywheel 16 and the normalised axial force (i.e. load/area) that the hydraulic ram 26 is to apply to push the second component 18.

When the components 18, 24 are initially pushed together, the upset sensor 32 measures the initial upset length, as indicated at Stage B in FIG. 2. This is designated as Ui when the initial upset length is measured as being greater than a minimum upset length, for example, 0.1 mm, the RPM Sensor 30 measures the RPM of the fly wheel 16 (the measured RPM being designated as RPMi) and sets this as $RPM_0$. Alternatively, also as shown in FIG. 2, when the RPM of the fly wheel 16 is greater than a minimum predetermined value, this RPM is set as $RPM_0$. These steps are shown in Stages C and D in FIG. 2. The computer processing unit 28 then calculates as shown in Stage E, a predicted final upset length $U_{pred}$ using the following equation in one of the two ways set out below.

When the predicted final upset length $U_{pred}$ has been calculated, the RPM of the fly wheel 16 sensed by the RPM sensor 30. This RPM is designated RPMi. If the RPMi of the fly wheel arrangement 16 is above the minimum predetermined RPM value, as shown at Stage F, the computer processing unit 28 then compares the predicted final upset length $U_{pred}$ with a desired final upset length $U_{USL}$. The desired final upset length is the final upset length of the weld that provides the desired final weld.

If the predicted final upset length $U_{pred}$ is greater than the upper specified limit of the desired final upset length $U_{USL}$, as shown at Stage G, then the computer processing unit 28 actuates the energy adjustment arrangement 34 to reduce the kinetic energy of the fly wheel 16, for example by applying brakes to reduce the speed of rotation of the fly wheel 16, as shown in Stage H. Alternatively if the predicted final upset length $U_{pred}$ is less than the lower specified limit of the desired final upset length $U_{LSL}$, as shown at Stage I, then the computer processing unit 28 actuates the energy adjustment arrangement 34 to reduce the rate of decrease of the kinetic energy of the fly wheel arrangement 16, by reducing the rate of decrease of the speed of the fly wheel arrangement 16, as shown at Stage J.

At this point in the process, the apparatus 10 can then allow process to end as shown by the broken lines designated 38 in FIG. 2. This is done by allowing the speed of the fly wheel arrangement 16 to reduce naturally under the force of friction.

Alternatively, as shown by the solid lines, designated 40, the above Stages B to J are repeated as often as required until the RPM of the fly wheel 16 has reduced to below the predetermined minimum value mentioned above. At this point, as shown by the line 42, the speed of the fly wheel 16 is then allowed to reduce naturally to zero under the force of friction between the two components 18, 24.

The process involves two methods of calculations the predicted upset length $U_{pred}$.

In the first method $C_1$, a constant is calculated by the computer processing unit 28, as would be understood by persons skilled in the art, as a function of the moment of inertia I of the system and the value of $RPM_0$, i.e.

$$C_1 = f(I, RPM_0)$$

$C_2$ is a material parameter, which would be understood by persons skilled in the art and inputted into the computer processing unit 28 by the user.

C is a constant of the system is then calculated by the computer processing unit 28 from $C_1$ and $C_2$ as follows:

$$C = \frac{C_1}{C_2}.$$

The predicted final upset length $U_{pred}$ is then calculated by the computer processing Unit 28 from $RPM_0$ and C, as follows:

$$U_{pred} = C \cdot (RPM_0)^2$$

In the second method, $C_1$ is calculated by the computer processing unit 28 as in the first method, i.e.

$$C_1 = f(I, RPM_0)$$

$C_2$ is then calculated by the computer processing unit, using the following equations:

$$\frac{d(E_{burn\text{-}off}/A)}{dU} \cdot U_{pred} + E_{cond}/A = E_{tot}/A \Rightarrow U_{pred} \quad (Eq\ 1)$$

$$= \frac{E_{tot}/A - E_{cond}/A}{\frac{d(E_{burn\text{-}off}/A)}{dU}}$$

But $$E_{tot}/A = E_{burn\text{-}off,0}/A + E_{cond}/A$$

and for a set of inertia & A, (Eq 2)

$$E_{burn\text{-}off}/A = C_1; RPM^2 \Rightarrow U_{pred} = C(RPM)^2 \text{ also}$$

$$\frac{d(E_{burn\text{-}off}/A)}{dU} \quad C_2 \text{ Constant for a specific material}$$

$$C = \frac{C_1}{C_2}$$

C is then calculated by the computer processing unit as $$C = \frac{C_1}{C_2}$$

The predicted final upset length $U_{pred}$ is then calculated by the computer processing unit from $RPM_0$ and C as follows:

$$U_{pred} = C \cdot (RPM_0)^2$$

It will be appreciated that the second method requires more processing power than the first, but does not require $C_2$ to be inputted into the system.

The symbols used in the above equation, have the following meaning, $E_{tot}$ is the total energy imparted to the two components by the welding process;

$E_{cond}$ is the energy imparted to the components from their initial contact with each other to the time where the initial upset length is created;

$E_{burn\text{-}off}$ is the energy imparted to the two components after the initial upset length is created;

A is the total weld area;

U is the upset;

$C_1$ is a first constant which is a function of the moment of inertia 1 of the system and $RPM_0$ and the predicted final upset $U_{pred}$ is calculated from these values.

$C_2$ is a material parameter as defined above.

Various modifications can be made without departing from the scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A friction welding process comprises the following steps:
   a) providing first and second work pieces to first and second holding members, respectively, to be welded together;
   b) imparting rotary motion to the first work piece relative to the second work piece thereby imparting kinetic energy to the first work piece relative to the second work piece;
   c) applying a predetermined force to move one or both of the first and second work pieces towards the other to create an upset length in the work pieces;
   d) measuring a rate of motion of the first work piece relative to the second work piece;
   e) calculating a predicted final upset length based on the rate of motion of the first work piece obtained from the step (d) and the applied force from the step (c);
   f) comparing the predicted final upset length with a desired final upset length; and
   g) controlling an energy adjustment arrangement to directly adjust the kinetic energy of the first work piece by actively adjusting at least the rate of motion of the first work piece based on the measured rate of motion and the predicted final upset length to achieve substantially the desired final upset length.

2. The friction welding process according to claim 1, wherein the process is an inertia friction welding process.

3. The friction welding process according to claim 1, wherein the second work piece is rotatably fixed.

4. The friction welding process according to claim 1, wherein the steps (d) to (g) are repeated to achieve the desired final upset length.

5. The friction welding process according to claim 4, wherein the steps (d) to (g) are repeated until the rate of motion reduces to a predetermined level.

6. The friction welding process according to claim 1, wherein the step (g) further comprises reducing the rate of decrease of the kinetic energy when the predicted final upset length is less than the desired final upset length.

7. The friction welding process according to claim 1, wherein the step (g) further comprises enhancing the rate of decrease of the kinetic energy when the predicted final upset length is greater than the desired final upset length.

8. The friction welding process according to claim 1, wherein the step of adjusting the rate of motion comprises reducing the rate of decrease of the rate of motion when the predicted final upset length is less than the desired final upset length.

9. The friction welding process according to claim 1, wherein the step of adjusting the rate of motion comprises enhancing the rate of decrease of the rate of motion when the predicted final upset length is greater than the desired final upset length.

10. The friction welding process according to claim 1, wherein the step (d) further comprises measuring an initial upset length, and/or measuring an initial rate of motion of the first holder.

11. The friction welding process according to claim 10, the process further comprising calculating an initial predicted final upset length from the measured rate of motion at which the initial measured upset length is measured when the initial measured upset length is greater than a predetermined value.

12. The friction welding process according to claim 1, wherein the step (d) further comprises measuring the rate of motion at least one other time during the process to determine the predicted final upset length at the, or each, other time.

13. The friction welding process according to claim 1, wherein the step (d) further comprises measuring the rate of motion a plurality of times during the process to determine the predicted final upset length each time.

14. The friction welding process according to claim 1, wherein the step (c) further comprises applying a plurality of forces to effect the movement.

* * * * *